United States Patent
Leclercq et al.

(10) Patent No.: US 7,700,505 B2
(45) Date of Patent: Apr. 20, 2010

(54) GYPSUM BOARD AND SYSTEMS COMPRISING IT

(75) Inventors: Claude Leclercq, Pernes les Fontaines (FR); Steven Roy Butler, Le Thor (FR)

(73) Assignee: Lafarge Platres, Avignon Cedex (FR)

( * ) Notice: Subject to any disclaimer, the term of this patent is extended or adjusted under 35 U.S.C. 154(b) by 1446 days.

(21) Appl. No.: 10/943,949

(22) Filed: Sep. 20, 2004

(65) Prior Publication Data

US 2006/0068186 A1  Mar. 30, 2006

(30) Foreign Application Priority Data

Sep. 1, 2004 (EP) .................................. 04292115

(51) Int. Cl.
*B32B 13/02* (2006.01)
*B32B 13/14* (2006.01)

(52) U.S. Cl. ........................... 442/386; 442/86; 442/88; 442/415; 442/416; 442/417; 442/136; 442/381; 428/294.7; 428/703

(58) Field of Classification Search ................. 442/386, 442/381, 86, 88, 417, 415, 416, 136; 428/294.7, 428/703

See application file for complete search history.

(56) References Cited

U.S. PATENT DOCUMENTS

| | | | |
|---|---|---|---|
| 4,047,355 A | 9/1977 | Knorr | |
| 4,647,496 A | 3/1987 | Lehnert et al. | |
| 4,783,942 A | 11/1988 | Nunley et al. | |
| 5,319,900 A | 6/1994 | Lehnert et al. | |
| 5,552,187 A | 9/1996 | Green et al. | |
| 2003/0044566 A1* | 3/2003 | Yang et al. | 428/74 |
| 2004/0142618 A1* | 7/2004 | Porter | 442/266 |
| 2005/0238863 A1* | 10/2005 | Swales et al. | 428/292.1 |

FOREIGN PATENT DOCUMENTS

| | | |
|---|---|---|
| EP | 1 016 757 A1 | 7/2000 |
| WO | WO 02/06605 A1 | 1/2002 |

* cited by examiner

*Primary Examiner*—Norca L Torres-Velazquez
(74) *Attorney, Agent, or Firm*—Buchanan Ingersoll & Rooney PC

(57) ABSTRACT

The invention relates to a new plasterboard having a facer comprising two plies, and uses of such plasterboards in EIS or EFS.

125 Claims, No Drawings

GYPSUM BOARD AND SYSTEMS COMPRISING IT

TECHNICAL FIELD

The invention relates to a new gypsum board having a mat-facer and uses in exterior insulating systems and sheathing, as well as in interior systems, and generally speaking in any wet or humid area. The invention also provides processes for manufacturing the board.

STATE OF THE ART

U.S. Pat. No. 4,647,496 discloses an exterior finishing system for a building, including particularly an exterior insulation system, which includes a fibrous mat-faced gypsum board, preferably a board in which the set gypsum core thereof is water resistant, and preferably one in which the set gypsum core is sandwiched between two sheets of porous glass mat, with the outer surface of at least one of said mats being substantially free of set gypsum, and means for preparing the board, including control of the viscosity of the aqueous gypsum slurry from which the set gypsum core of the board is formed. Also, the use of fibrous mat-faced gypsum board as the shaft liner panel in a shaft wall assembly is disclosed.

U.S. Pat. No. 4,783,942 discloses a composite roof/roof deck assembly and method of installation wherein a roof covering of polymeric sheet material is adhered to an underlying gypsum board roof substrate with a water-based polymeric adhesive. The gypsum board has a porous fibrous glass mat facing to enhance bonding between the water-based adhesive and the gypsum board.

U.S. Pat. No. 5,319,900 discloses finishing systems and roof decks which include a gypsum board having a set gypsum core faced with a fibrous mat. The gypsum core includes one or more additives which are effective in simultaneously improving the water and fire resistance of the board. In some embodiments, the board has sufficient water-resistant additive for absorbing less than about 10% water in an ASTM C-473 test.

U.S. Pat. No. 5,552,187 discloses a fibrous mat-faced gypsum board which is coated with a water-resistant resinous coating.

EP-A-1016757 discloses a multiple layer mat comprising a fibrous nonwoven body portion and a surface portion, said body portion and said surface portion comprising fibers and/or particles, the fibers in the body portion and the fibers and/or particles in the surface portion being bonded together with a same resinous binder. In one embodiment, the mat is one wherein the fibers and/or particles in the surface portion amount to about 0.5-20 wt % of the fibers in the body portion of the mat and wherein the fibers and/or particles in the surface portion are large enough that more than 99% of the particles and/or fibers are larger than the openings between the fibers in the body portion.

Applicant has also marketed a board, having a facer comprising at least two plies, an inner ply and an outer ply, where the inner ply is in contact with the core of said gypsum board and said outer ply comprises essentially cellulose fibers. This board has so far been used only in fire applications.

Despite the above solutions, there is still a need to improve existing boards when they are used in a wet area, be it outdoor or indoor.

SUMMARY OF THE INVENTION

The invention thus provides:
1) A gypsum board comprising at least one mat-facer, wherein said at least one mat-facer comprises at least two plies, an inner ply and an outer ply, where the inner ply is in contact with the core of said gypsum board and comprises a mixture of cellulose fibers, inorganic or mineral fibers and optionally organic fibers, and said outer ply comprises essentially cellulose fibers, wherein said mat-facer further comprises at least a binder and at least mineral filler particles, said particles being distributed at least partially into said inner and/or outer ply.
2) A gypsum board comprising at least one mat-facer, wherein said at least one mat-facer comprises at least two plies, an inner ply and an outer ply, and wherein the core comprises water-resistant additive in an amount sufficient such that the core absorbs less than about 10%, preferably less than about 5%, more preferably less than about 3%, water when tested in accordance with ASTM method C-473 and/or in accordance with EN 520 method section 5.9.2 and wherein the core comprises fire-resistant additive in an amount sufficient such that the board achieves an ASTM E-119 and/or C36-95 fire rating of at least about one hour.
3) An exterior insulation system for a building comprising a mat-facer gypsum board, insulating material having an inner surface and an outer surface, the inner surface of which is adhered to the surface of the mat-facer of said gypsum board by an adhesive material, and an exterior finishing material overlying the outer surface of said insulating material, wherein said mat-facer of the gypsum board comprises at least two plies, an inner ply and an outer ply, where the inner ply is in contact with the core of said gypsum board and comprises a mixture of cellulose fibers, inorganic or mineral fibers and optionally organic fibers, and said outer ply comprises essentially cellulose fibers.
4) An exterior insulation system for a building comprising a mat-facer gypsum board, insulating material having an inner surface and an outer surface, the inner surface of which is adhered to the surface of the mat-facer of said gypsum board by an adhesive material, and an exterior finishing material overlying the outer surface of said insulating material, wherein said mat-facer of the gypsum board comprises at least two plies, an inner ply and an outer ply, where the inner ply is in contact with the core of said gypsum board and where said mat-facer comprises a fibrous nonwoven inner ply and an outer ply, said inner ply and said outer ply comprising fibers and/or particles, the fibers in the inner ply and the fibers and/or particles in the outer ply being bonded together with a same resinous binder.
5) An exterior finishing system for a building comprising an underlying structural support element which is covered with an overlying finishing material, said support element including mat-facer gypsum board comprising a set gypsum core sandwiched between two sheets of facers, the gypsum core including water-resistant additives in an amount at least sufficient to impart to the core improved water-resistant properties, wherein said mat-facer of the gypsum board comprises at least two plies, an inner ply and an outer ply, where the inner ply is in contact with the core of said gypsum board and comprises a mixture of cellulose fibers, glass fibers and optionally organic fibers, and said outer ply comprises essentially cellulose fibers.
6) An exterior finishing system for a building comprising an underlying structural support element which is covered with an overlying finishing material, said support element including mat-facer gypsum board comprising a set gypsum core sandwiched between two sheets of facers, the gypsum core including water-resistant additives in an amount at least sufficient to impart to the core improved water-resistant properties, wherein said mat-facer of the gypsum board comprises at least two plies, an inner ply and an outer ply, where the inner ply is in contact with the core of said gypsum board and where said mat-facer comprises a fibrous nonwoven inner ply and an outer ply, said inner ply and said outer ply comprising fibers and/or particles, the fibers in the inner ply and the fibers and/or particles in the outer ply being bonded together with a same resinous binder.

7) An internal wet or humid area partition assembly system comprising metal or wood framework or studs for support of a board, said board including a mat-facer gypsum board comprising a set gypsum core sandwiched between two sheets of facers, the gypsum core including water-resistant additives in an amount at least sufficient to impart to the core improved water-resistant properties, wherein said mat-facer of the gypsum board comprises at least two plies, an inner ply and an outer ply, where the inner ply is in contact with the core of said gypsum board and comprises a mixture of cellulose fibers, inorganic or mineral fibers and optionally organic fibers, and said outer ply comprises essentially cellulose fibers.

8) An internal wet or humid area partition assembly system comprising metal or wood framework or studs for support of a board, said board including a mat-facer gypsum board comprising a set gypsum core sandwiched between two sheets of facers, the gypsum core including water-resistant additives in an amount at least sufficient to impart to the core improved water-resistant properties, wherein said mat-facer of the gypsum board comprises at least two plies, an inner ply and an outer ply, where the inner ply is in contact with the core of said gypsum board and where said mat-facer comprises a fibrous nonwoven inner ply and an outer ply, said inner ply and said outer ply comprising fibers and/or particles, the fibers in the inner ply and the fibers and/or particles in the outer ply being bonded together with a same resinous binder.

DETAILED DESCRIPTION OF EMBODIMENTS OF THE INVENTION

The invention is about a board, specific components thereof and processes for their manufacture, as well as indoor and outdoor uses.

The board comprises a core and mat-facers.

Core Composition.

The core composition comprises in a common way "plaster" or set gypsum. These terms should be understood to mean, in the present description, the product resulting from the hydraulic setting and the hardening of a hydratable calcium sulfate, that is to say an anhydrous calcium sulfate (anhydrite II or III) or a semihydrated calcium sulfate ($CaSO_4 \cdot \frac{1}{2}H_2O$) in its $\alpha$ or $\beta$ crystalline form. These compounds are well known to those skilled in the art. The gypsum may also comprise other hydraulic binders in low amounts. The core density can be from about 700 $kg/m^3$ to about 1000 $kg/m^3$, especially from about 750 $kg/m^3$ to about 950 $kg/m^3$. Typically the core density is about 850 $kg/m^3$.

The core also comprises water-resistance additives and also preferably, although this is not necessary, fire-resistant additives.

Water-Resistant Additives.

Any additive known is suitable for use in the invention.

Examples of materials which have been reported as being effective for improving the water-resistant properties of gypsum products are the following: poly(vinyl alcohol), with or without a minor amount of poly(vinyl acetate); metallic resinates; wax or asphalt or mixtures thereof; a mixture of wax and/or asphalt and also cornflower and potassium permanganate; water insoluble thermoplastic organic materials such as petroleum and natural asphalt, coal tar, and thermoplastic synthetic resins such as poly(vinyl acetate), poly(vinyl chloride) and a copolymer of vinyl acetate and vinyl chloride and acrylic resins; a mixture of metal rosin soap, a water soluble alkaline earth metal salt, and residual fuel oil; a mixture of petroleum wax in the form of an emulsion and either residual fuel oil, pine tar or coal tar; a mixture comprising residual fuel oil and rosin; aromatic isocyanates and diisocyanates; silicone derivatives, e.g. organohydrogenpolysiloxanes or silicone oils; clay particles (preferably ones with OH functions) coated with polysiloxane as disclosed in WO-A-0047536, incorporated herein by reference; a wax-asphalt emulsion with or without such materials as potassium sulfate, alkali and alkaline earth aluminates, and Portland cement; a wax-asphalt emulsion prepared by adding to a blend of molten wax and asphalt an oil-soluble, water-dispersible emulsifying agent, and admixing the aforementioned with a solution of casein which contains, as a dispersing agent, an alkali sulfonate of a polyarylmethylene condensation product.

The amounts of water-resistant additives may vary between broad ranges depending on the type of additives, and can be from about 0.05 wt % to about 5 wt %, preferably 0.5 wt % to 3 wt %. Reference weight is the total weight of the core material. In general, the amount of such additives will be such that the core absorbs (in weight) less than about 10%, preferably less than about 7.5% and most preferably less than about 5%, and especially less than about 3% water when tested in accordance with ASTM method C-473. In another embodiment, the same ranges of values apply when tested in accordance with standard EN 520 (method depicted in section 5.9.2).

Fire-Resistant Additives.

Any additive known is suitable for use in the invention.

In applications of the type where fire-resistant properties are considered important, the core of the mat-faced gypsum board includes preferably one or more additives which improve the ability of the set gypsum composition to maintain its integrity when subjected to the heat of fire. Examples of materials which have been reported as being effective for improving the fire-resistant properties of gypsum products include mineral fibers such as, for example, glass fibers (e.g. chopped glass fibers), basalt fibers and calcium sulfate whisker fibers. A mixture of one or more of such fibers can be used. Other exemplary materials which are known for use in conventional fire resistant gypsum board are unexpanded vermiculite, clay, colloidal silica and colloidal alumina. Typically, mineral fibers, and particularly glass fibers, and mineral filler such as clay or vermiculite, are used.

The amount of fire-resistant material included in the core is generally from about 0.03 wt % to about 10 wt %, depending on the type of material that is used. For mineral filler such as clay or vermiculite, the amount is generally from 2 wt % to 10 wt %. Reference weight is the total weight of the core material. The amount of glass fibers included in the core is generally from about 0.1% to 1%. In general, the amount of such additives will be such that the board achieves an ASTM E-119 fire rating of at least about one hour. Alternatively, the amount of such additives will be such that the board achieves an ASTM C36-95 (§4.2) one hour fire resistance.

Further Additives.

The core composition may comprise further known additives, such as anti-mould, biocide, etc. It should be understood that any additive classically used in the art could also be used in the instant core. The additives are those influencing the behavior of the slurry like retarders/accelerators but not limited to them and additives influencing the behavior of the final product like biocides but not limited to them. The range of additives is very wide as will appreciate the skilled man. Resins for the improvement of the mechanical and/or aesthetic properties, known in the art can be added. Repetition retarders and accelerators can also be used in the invention. Foaming agent is also commonly used in most plasterboards in order to obtain the rather light density (700 to 1000 kg/m$^3$). A bubble stabilizing agent can also be used. These additives are typically thickeners which make bubbles more durable. Examples are guar gums, xanthan gums, ethyl- or methyl-cellulose, starch, gelatin, and the like. A water-soluble viscosity modifier can also be used. These may be similar to bubble stabilizers, but in different concentration in order to achieve a viscosity change in the whole slurry. Starch is also used in a classical manner, especially to improve the binding at the interface core/mat. Because the instant boards of the invention are likely to be used in a water (e.g. wet or moist) environment, a fungicide and/biocide will also be added in a conventional manner, so as to avoid mould and algae. Last, lime is one additive that has proven to be useful to improve the wet resistance of the core. The concentration of these additives is also well known in the art. The lime amount will generally be less than 0.5%, preferably less than 0.2% (typically more than 0.05%).

In one embodiment, the further additives will comprise fibers, preferably facer or paper fibers, most preferably from recycling.

The second component of the board is the mat-facer. In one embodiment of the invention, this facer is specific. Usually the board comprises two mat-facers, preferably being identical.

Facer.

The mat-facer is the mat type, i.e. non-woven. In one embodiment it is fibrous. It comprises at least two plies, an inner ply and an outer ply. Other plies can be present as well, if need be. The inner ply is the one in contact with the gypsum core. The inner ply comprises a mixture of cellulose fibers, glass fibers and optionally organic (polymeric) fibers. The said outer ply comprises essentially cellulose fibers; i.e. the cellulose fibers represent at least 90 wt %, preferably 95 wt %, more preferably 98 wt % and advantageously about 100 wt % of the fibers. The mat-facer further comprises at least a binder (as is typical in the mat industry) and in one embodiment at least mineral filler particles, said particles being distributed at least partially into said inner and/or outer ply.

When used, the filler particles are of such particle size that they substantially penetrate into the fibrous plies. For example, the mineral filler particles have a d$_{50}$ from about 0.1 to about 10 μm, preferably about 0.5 to about 5 μm. Coarser material may however be used. Without wishing to be bound by any theory, Applicant believes that the filler particles will block substantially the porosity of the fibers, so that the facer becomes substantially water-impervious, but remains permeable to vapor water to allow drying in a conventional drying unit of a conventional wall board plant. The air porosity of the mat-facer is adjusted, as will be disclosed below.

The mineral filler can be any filler known in the art, organic or inorganic powders, for example calcium carbonate, calcium sulfate (anhydrite, semi-hydrate or dihydrate), clay, kaolin, sand, talc, mica, glass powder, titanium dioxide, magnesium oxide, alumina, alumina trihydrate (ATH), aluminium hydroxide, antimony oxide, silica, silicate, carbon, boron, beryllium, etc. Kaolin is one preferred filler.

The inner ply preferably comprises by weight, based on the total weight of the fibers used in the inner ply, from 25 to 60 wt % of cellulose fibers, from 25 to 60 wt % of mineral or inorganic fibers, and from 0 to 30 wt % of organic fibers, and more preferably from 30 to 50 wt % of cellulose fibers, from 30 to 50 wt % of glass fibers, and from 10 to 20 wt % of organic fibers.

The mineral or inorganic fiber is any fiber known in the art useful for manufacturing plies of mat-facers. Diameters may vary within broad ranges, for example from 5 to 40 μm. The mineral or inorganic fibers used in the inner ply can be of any suitable length, for example from 0.25 cm up 5 cm. Mixtures of fibers of different lengths and/or fiber diameters can be used as is known. One example of such fibers is basalt fibers.

The glass fibers can be any type of fibers used in the mat industry. The glass fibers can be E, C, T, S or any known type glass fiber of good strength and durability in the presence of moisture and mixtures of lengths and diameters. Any commercially wet chop glass fiber product will be suitable. Diameters may vary within broad ranges; 15 μm or lower values or 23 μm or higher values are appropriate. The glass fibers used in the inner ply can be of any suitable length, for example from 0.25 cm up 5 cm, preferably 0.6 to 1.2 cm. Mixtures of fibers of different lengths and/or fiber diameters can be used as is known. These fibers can be coated with a silane containing size composition as is well known in the industry.

Mixtures of any type of mineral or inorganic fibers can be used. The glass fibers may be replaced in part with any mineral fiber known in the art.

The cellulose fibers are classical fibers, and can be obtained from kraft papers, i.e. be recycled or obtained from wood, as is known in the art, e.g. resinous trees. A mixture of various woods or sources is also suitable. One preferred embodiment is obtained with pure cellulose of selected trees comprising resinous trees.

The organic (polymeric) fibers are any known polymer fibers, and can include polyamide, polyaramide, polyethylene, polypropylene, polyester, etc. Polyester is the preferred organic fiber. The dimensions of the organic fibers are in the same range than the ones for the glass fibers.

A resinous binder will confer structural integrity to the mat by holding the fibers together. Especially, the same binder is used in both inner and outer plies.

The binder used can be any binder typically used in the mat industry. A wide variety of binders are used to make mats nonwovens, such as urea formaldehyde (UF), melamine formaldehyde (MF), polyester, acrylics, polyvinyl acetate, UF and MF binders modified with polyvinyl acetate and/or acrylic, styrene acrylic copolymers, etc. Preferably, said binder is a self cross-linkable binder, e.g. a styrene acrylic copolymer (with pendant cross-linking functionalities). Preferably, said binder is a hydrophobic binder; especially it is desired to have a binder that would coat the fibers and further protect them against water.

In one embodiment, the inner and/or outer plies further comprise a water-resistant agent. Said water-resistant or repellent agent can be any agent typically used, and can for example be one useful also for the gypsum core. In one embodiment, said water repellent agent is a fluorocarbon repellent or a fluorinated polymer. The amount of said fluorinated compound (on the basis of the dry content) may vary from about 0.1 to about 5 wt %, preferably about 0.3 to about 2 wt %, based on the total weight of the mat-facer. One example of fluorinated polymer is an acrylic polymer having a pendant (per)fluorinated group having 4 to 20 carbon atoms. Further details may be found in JP09310284 to OJI.

The plies are such that their surface weight may vary within broad limits. For example, the inner ply may represent from about 30 to about 150 g/m$^2$, the outer ply may represents from about 10 to about 70 g/m², the binder may represent from about 10 to about 100 g/m² or the binder and filler together may represent from about 20 to about 150 g/m². The entire mat-facer represents for example from about 100 to about 200 g/m².

When used together, the binder and the filler are used in varying amounts; e.g. the weight ratio binder:filler is from about 1:2 to about 8:1, preferably from about 1:1 to about 4:1.

Because the mat-facer has substantially no glass fiber on its outer surface, it will not cause an itching issue and it will be less irritating to workers.

The process for manufacturing the mat-facer used in the invention is in fact quite conventional as it uses typical apparatuses. The method comprises basically three steps. The first step comprises dispersing fibers, such as glass fibers and cellulose fibers, in an aqueous slurry, collecting the dispersed fibers onto a moving permeable support to form a fibrous nonwoven layer, removing excess water from the fibrous nonwoven layer. One thus obtains a web that will form the inner ply. The second step comprises dispersing cellulose fibers, in an aqueous slurry, collecting the dispersed fibers onto the moving web formed in step (1) to form a fibrous nonwoven layer on top of this, removing excess water from the fibrous nonwoven layers. One thus obtains a web that will form the outer and inner plies. It is of course possible to reverse the process and first form the outer ply. The third step comprises the step of impregnating the web with a binder solution, preferably an aqueous binder solution. The binder solution may if required contain the filler and optionally the water-repellent, and any other additives (e.g. a fungicide/biocide). The third step is usually the classical sizing step known in the industry. The final step is a classical drying step, which may comprise a curing step for the binder. The fiber concentration in the slurries is classical and can vary (see for example EP-A-1016757) from less than 0.1 wt % to about 1 wt %. Most nonwoven mat processes and forming machines are suitable for modification and use with the present invention, but preferred are the wet laid nonwoven mat processes and machines wherein an aqueous slurry containing fibers is directed onto a moving permeable screen or belt called a forming wire to form a continuous nonwoven wet fibrous mat.

Manufacturing Process of the Board.

The manufacturing process of the board of the invention is very simple, since it can be carried out on a conventional wall board line. Especially, compared to previously known techniques, there is no need to specifically control the viscosity of the plaster slurry, since the plies usually exhibit a blocked porosity with the filler such that the gypsum will not substantially penetrate into the mat-facer.

Briefly, the process for manufacturing a gypsum board comprises the following steps:

preparation of a plaster slurry by mixing the various constituents of the composition with water in a mixer;

deposition of the slurry thus prepared on at least one mat-facer of the invention, on the inner ply of this mat, followed by the shaping and the covering of the upper face of the slurry using a second reinforcing material, preferably a second mat-facer of the invention, onto its inner ply;

where appropriate, shaping of the edges of the board obtained previously by molding the fresh plaster on profiled bands, this shaping comprising especially feathering the edges of the board;

hydraulic setting of the hydratable calcium sulfate on a manufacturing line while the ribbon of hydratable calcium sulfate board runs along a conveyor belt;

cutting of the ribbon at the end of the line into predetermined lengths; and drying of the boards obtained.

Properties of the Mat-Facer and Board.

The board of the invention has numerous properties that are useful. Especially, the board withstands wet conditions, and also fire conditions as well. Waterproofing of the board allows this board to retain mechanical properties in wet conditions.

Mat-Facer.

The mat-facer used in the invention (be it with or without any filler in the plies) exhibits one or more of the following properties.

The slurry permeability is such that the plaster slurry does not flow through the facer (especially when a filler is present). For example, the slurry permeability through the facer without filler is generally below 300 g/m², and generally lower than 50 g/m² through the facer with filler. The slurry permeability is measured as follows. A piece of mat-facer is placed on top of two pieces of conditioned media and a piece of polyethylene. A ring is placed on top of this, with an inner diameter of 80 mm and a height of 40 mm. The ring is filled with a plaster slurry (prepared as follows: W/P of 0.75, 0.01 wt % citric acid; the ring is filled after 3 minutes). After a contact time of 3 minutes, the paper pieces are removed and weighted. The weight difference is an expression of the water that penetrated through the mat-facer and is the slurry permeability through the facer. Also, the facer is such that the water vapor may go through it, allowing the drying conditions to remain classical when manufacturing the wallboard. Notably, the porosity of the mat-facer is from about 10 to about 60 l/m²/s under 196 Pa. This air porosity is the volume of air that goes through a given surface in a given period of time under a given pressure. It is expressed in liter per square meter per second. The pressure applied is chosen here at 196 Pa. A suitable apparatus is e.g. a permeameter textest. One may also refer to standard DIN 53-887.

The one minute Cobb values are measured according to standard NF Q 03-014 (with the same operating conditions with a duration of one minute; briefly as follows: The facers samples are cut at 125*125 mm conditioned at 23° C. 50% RH and weighed ($M_{to}$). The facer specimen is then set in the Cobb apparatus under the steel ring. The latter is filled with 100 ml of water at 23° C. 45 seconds later, water is removed, the specimen is wiped with blotting paper and weighed again at 1 minute ($M_{t1}$). The Cobb result is expressed as $M_{t1}-M_{to}$.

The one minute Cobb value of the mat-facer may, in one embodiment, be in the same range of values between the bottom and top. The bottom value is the value of the mat-facer on the side that is contact with the gypsum core while the top value is the value on the outer side of the mat-facer. It is possible to have Cobb values that vary and can be for example from the bottom value is typically from about 5 to about 40 g/m², especially from about 5 to about 10 g/m². Bottom values may also be about 20% higher than top values.

The mat-facer when used in the invention provides numerous advantages.

The ratio dry mechanical resistance/thickness is unique to the instant mat-facer. A standard paper would require an increase in thickness of at least 50% thickness more to reach the same results. The same holds true for the ratio dry mechanical resistance/surface weight.

The low level of water absorption is achieved at low cost.

The bonding at wet end of the board line (i.e. at the flipper) is sufficient with the mat-facer of the invention, owing to the glass fibers bridging the gypsum crystals. Boards can thus be handled while wet.

The compromise between tightness to liquid water (for final properties of board), and sufficient water absorption on bottom facer associated to mechanical bridging (for bonding at wet end) and sufficient porosity (to remove vapor water in the drier) allows manufacturing such board of the invention on a conventional wallboard line.

Also, the Top Cobb value, associated with the type of outer ply, allows still a good anchoring of cement-based adhesive for tile backing application or EIS or EFS. Hence, water-based adhesives can still be used on the boards of the invention.

Most important, the mat-facer of the invention is definitely of the paper type (rather than a traditional glass mat used up to now in this type of industry).

The mat-facer is generally not post-treated with on-line coating, in contrast with existing technology, since the binder used to manufacture this paper-like mat-facer improves sufficiently the water-resistance—while still allowing water vapor to breathe out during drying of the board during its manufacture.

Board.

Usually, the dry tensile strength of the facer is, in MD (machine direction), from about 9000 to about 15000 N/m wide, typically about 12000 N/m wide. Usually, the dry tensile strength is, in TD (transverse direction), from about 3500 to about 6500 N/m wide, typically about 5000 N/m wide. Usually, the wet tensile strength of the facer (as measured in conditions similar than for the water immersion test of the board, i.e. two hours immersion) is, in MD (machine direction), from about 4500 to about 7500, typically about 6000 N/m wide. Usually, the wet tensile strength of the facer is, in TD (transverse direction), from about 1800 to about 3200, typically about 2500 N/m wide. Typically, the ratio wet/dry for the tensile strength of the facer is about 0.5.

The flexural strength of the board is measured according to standard EN520, section 5.7. The flexural strength is generally related to the tensile strength of the facer of the board.

The flexural breaking load of the board is generally as follows:
  dry breaking load in MD: from about 550 to about 800 N, typically about 650 N;
  wet breaking load in MD, wet conditions (2 days at 23° C./95% RH) from about 500 to about 700 N, typically about 600 N;
  wet breaking load in MD, immersion conditions (2 hours immersion) from about 250 to about 400 N, typically about 330 N;
  Typically, the ration wet/dry for the flexural strength is about 0.5.

When used, an anti-mould agent will confer the required mould protection. The anti-mould agent can be incorporated in the gypsum core, or in the facer or both. During drying of plasterboard, the anti-mould agent will generally migrate to the interface core/facer and thus protect starch and cellulose as well.

The core treated with water-resistance additives, together with the mat-facer of the invention is such that the water uptake after 2 hours immersion is lower than 3%.

Uses.

The board can be used in a variety of applications, both indoors and outdoors.

As an example of an indoor application, one may mention shaft wall assemblies, tile backing as well as partitions and ceilings in wet area rooms.

A gypsum board as described herein can be used to particular advantage as a component of a partition or shaft wall assembly or similar assembly in the interior of a building. In such application, the mat-faced board can be used with particular advantage in place of conventional paper-faced gypsum core board or shaft liner panels, the core of which may include fire-resistant additives. Assemblies of this type generally comprise metal or wood framework or studs for support of the gypsum panels which form the partitions in bathrooms and other wet or humid areas, the walls of the shafts of elevators, stairwells and the like. Mat-facer gypsum board, as described herein, can be used, for example, as the shaft liner panel. For use in such application, the core of the board can include fire resistant additives.

One may refer to U.S. Pat. No. 4,047,355, incorporated herein by reference, for details on a shaft wall assembly.

The instant board can also be used with advantage in aeraulic ducts, in a manner similar to WO-A-02/06605.

The instant board can also be used with advantage as a tile backing in bathrooms.

The usual construction of bathroom walls includes a ceramic tiles adhered to an underlying base member, for example, a panel of gypsum board of the invention. Such a panel is referred to in the industry as a "tile backing board," or "tile backer". In usual fashion, sheets of tile backer are fastened by rust-resistant nails or screws to studs. The board joints and screw heads are then treated in a conventional manner with a water-resistant compound before the surface is finished, for example, by paint or ceramic tiles. Wall-to-wall and floor-to-wall joints may be treated additionally with conventional sealants or corking compounds before the surface is finished.

Pieces of ceramic tiles are adhered to the sheets of tile backer by water-resistant adhesive (e.g. "mastic") or by a Portland cement-based adhesive (e.g. "setting mortar"), the latter case being mostly for floor applications. Thereafter, spaces between the tiles and between the tiles and other adjoining surfaces are filled with a water-resistant material (the "grouting").

The instant boards will also be useful in any application for partitions and ceilings in wet area rooms. Also, the boards of the invention can be used in any application for which wall boards are known to be useful, including drywall.

As outdoor applications, one may mention especially, roof deck system and EIS (Exterior Insulating System) and EFS (Exterior Finishing System), which latter systems will be disclosed in more details below.

A typical roof deck system incorporating the gypsum boards of the invention is as follows. In this construction, spaced parallel trusses extending between building support members support usually a (corrugated) metal deck which is fastened to the trusses. Layers of insulating sheet material (e.g. expanded polystyrene) are disposed on the corrugated metal deck. A gypsum board of the invention is secured to the corrugated deck by means of fasteners. The joints of the boards are sealed in a conventional way by application of tape. Overlying the gypsum board is a waterproof roofing membrane. Typically this membrane comprises alternate layers of asphalt and roofing felt. A final coating of asphalt may be covered with a topping layer.

One may refer to U.S. Pat. No. 4,783,942, incorporated herein by reference, for details on a roof deck system.

Exterior Insulating Systems and Exterior Finishing Systems.

An EIS system typically comprises insulating material which is sandwiched between an underlying support surface and an exterior finishing material which can be an integral part of the insulating material, but which is usually applied to the insulating material at the site of installation. From one EIS system to the next, there exist variations in structural details and components. For example, although the exterior finishing material may be affixed directly to the insulating material, various systems include a reinforcing component sandwiched between the exterior finishing material and the insulating material. The reinforcing component comprises generally one or more plies of fiber glass reinforcing fabric or mesh which is adhered by suitable mastic to the surface of the insulating material. In some systems, the support surface is affixed to a wooden frame attached to the exterior surface of the outside wall of a building, whereas in other systems a metal frame is used. In certain applications, the support surface may be affixed directly to the exterior surface of an outside wall, for example, one comprising cinder blocks or concrete blocks. The adhesive or mastic for adhering together components of the system tends to vary from one system to the next, and are known. They typically comprise specially formulated proprietary compositions. Mechanically fastened insulation is also suitable. The improved support surface of the present invention can be used satisfactorily and to good advantage in EIS systems which include overlying plies of insulating and exterior finishing materials, and other optional components. The insulating material is generally substantially free of channels penetrating therethrough.

One useful insulating material in EIS systems is expanded or foamed polystyrene, a material which has good moisture resistant properties. Although it has desirably low water vapor transmission, it is not a vapor barrier, but instead is capable of breathing. Rigid panels of expanded polystyrene are used most widely in EIS systems. Such panels have satisfactory compressive strength and resilience and are presently available in varying thicknesses and lengths.

Other thermal insulating materials can be used in EIS systems also. Examples of such materials include extruded polystyrene, polyurethane, polyisocyanurate, cement-based insulating plasters, and phenolic foam. Insulating materials generally have low thermal conductivity and low density.

As mentioned above, various EIS systems include a reinforcing component, for example, in cloth form, sandwiched between the insulating material and the exterior finishing material. Glass cloth can be used in a conventional manner to reinforce the system, that is, to improve the impact strength of the system. The particular type or types of glass cloth used and the number of plies thereof which are used depend on the impact resistance which is desired. Examples of reinforcing cloth or fabric which can be used in the system are woven glass, glass fiber scrim and glass fiber mesh. A coating can be applied on the reinforcing cloth or fabric to protect from alkali attack in the adhesive. Installation of the reinforcing fabric generally involves applying a suitable adhesive to the surface of the insulating material and then applying the fabric thereto. Additional plies of fabric can be applied if desired. A cement/acrylic resin is an example of an adhesive that can be used.

The exterior finishing material can be affixed directly to the insulating material or to an intermediate surface such as, for example, the surface of a reinforcing member as described above. The exterior finishing material has weathering characteristics and is preferably appealing in appearance. Generally, an exterior finish that can be used is a conventional dry product that is mixed with water and then which is spread or troweled on the underlying substrate. Alternatively, one may use an acrylic resin-based composition which is available in a paste-type form. After application, the resin sets to form a tough, weather-resistant solid material which adheres tightly to the underlying substrate. Such resin compositions are available commercially in a variety of colors. They usually include aggregate which can vary in size. This allows the applicator to choose a particular composition which permits him to apply a finish that can vary in texture from fine to coarse. Examples of other materials that can be used as an exterior finish are Portland cement including, for example, sand and larger aggregate.

The exterior finish can vary in thickness over a wide range, as is known in the art, with a coating or layer thickness of about 2 to 6 mm being exemplary.

Different systems may have a different number of layers applied in the system. One typical example is the following in commercial applications: steel studs, building wrap (like Tyvek®), gypsum board, trowel on adhesive, EPS insulation, trowel on Portland cement-based adhesive, glass scrim reinforcement, "brown" support coat of Portland cement-based adhesive, and finally a color coat of Portland cement based mortar or a coat of paint.

The gypsum board of the present invention can be used also to good advantage in place of conventional gypsum sheathing in applications other than EIS systems, i.e. these systems having no insulating material. Thus, the board can be used as an underlying support surface which is covered with overlying finishing materials, for example, aluminum, wood siding, plaster and Portland cement.

Numerous advantages flow from the use of the present invention. An EIS system which includes a mat-facer gypsum support surface that has affixed thereto insulating material by adhesive only, that is, without fastening means which extend through the insulating material, has higher tensile or cohesive strength than a like system which includes conventional paper-faced gypsum board. The mat-facer of the gypsum support member is water resistant. This improved water resistance gives the applicator greater flexibility in selecting adhesives that can be used to adhere insulation directly to the mat-faced surface of the gypsum support element as adverse affects are not encountered by the use of water-based adhesives. The mat-facer of the gypsum support element is "nailable", and accordingly, it can be secured readily to an underlying frame or other substrate by nailing. The improved support surface of the present invention has improved rigidity and strength uniformity in both the length and width dimensions of the system. The preferred embodiment of the invention which includes the use of a water-resistant core provides a substantially improved weather-resistant product which better resists degradation both within and outside of the system.

One may refer to U.S. Pat. No. 4,647,496, U.S. Pat. No. 5,319,900 and U.S. Pat. No. 5,552,187, all incorporated herein by reference, for details on Exterior Insulating Systems and Exterior Finishing systems.

EXAMPLES

The following examples illustrate the invention without limiting it. Gypsum boards (standard 12.5 mm thick boards) are manufactured using a standard wallboard line, under standard conditions.

The following facers have been manufactured. The inner ply comprises, in wt % based on the total weight of the fibers, 45% cellulose fibers (length of about 2.5 to about 5 mm), 14% polyester fibers (length of about 3 to 12 mm and diameter of about 11 µm), and 41% glass fibers (length of about 6 to about 12 mm and diameter of about 23 µm). The dry surface weight is about 70 g/m². The outer ply comprises 100% cellulose fibers (length of about 2.5 to about 5 mm). The dry surface weight is about 20 g/m². The impregnation mixture comprises a binder (self cross-linkable styrene acrylic polymer), a fungicide, a fluorocarbon water repellent and optionally a filler. The respective amounts are, by weight of the impregnation mixture, 64 parts, 2 parts, 1 part and optionally 33 parts. The dry surface weight without filler is about 40 g/m², while it is about 60 g/m² with a filler. The filler is either calcium sulfate anhydrite or kaolin (grade such that $D_{50}$ is 1 to 5 μm). The first mixture is A1 while the second ones are B2 and B3, respectively, where the B2 mixture comprises 1 part of fluorocarbon and the B3 mixture comprises 2 parts of fluorocarbon.

The following table 1 lists the various components of the board. The relevant characteristics are gathered in table 2.

TABLE 1

| | Example | | | | | | | |
|---|---|---|---|---|---|---|---|---|
| | 1 | 2 | 3 | 4 | 5 | 6 | 7 | 8 |
| Mat-facer (both sides) | Basic No filler | Basic No filler | Mix A 1 | Mix B 2 | Mix B 3 | Mix A 1 | Mix B 3 | Mix B 2 |
| Semi-hydrate | 77% | 75% | 75% | 75% | 75% | 75% | 75% | 81% |
| Starch | 0.32% | 0.45% | 0.45% | 0.45% | 0.45% | 0.45% | 0.45% | 0.32% |
| Fluidicizer | 0.45% | 0.45% | 0.45% | 0.45% | 0.45% | 0.45% | 0.45% | 0.32% |
| Silicone B | 0.65% | 0.65% | 0.65% | 0.65% | 0.65% | — | — | 0.65% |
| Wax R | — | — | — | — | — | 2.8% | 2.8% | — |
| Clay C | 4.6% | 6.9% | 6.9% | 6.9% | 6.9% | 4.6% | 4.6% | — |
| Lime | — | — | — | — | — | — | — | 0.41% |
| Fungicide | 0.16% | — | — | 0.16% | — | — | 0.25% | 0.16% |

TABLE 2

| | (* curing is not needed when wax is used) | | | | | | | |
|---|---|---|---|---|---|---|---|---|
| Characteristics | H20 | H21 | H23 | H26 | H27 | H24 | H28 | H31 |
| Dry weight (kg/m2) | 10.90 | 10.85 | 10.80 | 10.97 | 10.70 | 11.00 | 10.80 | 10.80 |
| Bonding (g/5 cm) 23° C.-50% RH | 1500 | 1715 | 2170 | 1975 | 1730 | 2080 | 1730 | 1350 |
| Surface water absorption at 2 Hours | | | | | | | | |
| 1 week after making | 900 | 690 | 225 | 85 | 55 | 245 | 125 | 85 |
| After 1 month curing | 750 | 665 | 205 | 75 | 45 | no curing | no curing | 75 |
| Immersion 2 hours - Water uptake | | | | | | | | |
| 1 week after making | 7.2 | 5.3 | 5.0 | 3.9 | 2.8 | 1.4 | 1.75 | 1.85 |
| 1 month after making | 5.6 | 4.1 | 4.2 | 3.05 | 2.25 | no curing | no curing | 2.10 |

The results show the following:

dry bonding is good with the boards of the invention;

surface water absorption (in g/m²) for the mat-facer of the invention is good, and is especially improved when a filler is used;

water uptake after 2 hours immersion is a severe test, in so far as both sides and unprotected edges are immerged. Here again, the boards of the invention proved to be efficient, especially when a filler is present in the mat-facer.

For sake of comparison, tests have been carried out on an existing commercial product, Dens® Glass Gold from G-P Gypsum corporation.

thickness of 16 mm (instead of 12.5 mm for the above prototypes)

weight: 11.9 kg/m² bonding: 1800 g surface water absorption: 225 g/m² water uptake after immersion: 4.6%

The invention claimed is:

1. A gypsum board comprising at least one mat-facer and a gypsum core, wherein said at least one mat-facer comprises at least two nonwoven plies, an inner ply and an outer ply, where the inner ply is in contact with the core of said gypsum board and comprises a mixture of cellulose fibers, inorganic or mineral fibers and optionally organic fibers, and said outer ply comprises essentially cellulose fibers, wherein said mat-facer further comprises at least a binder and at least mineral filler particles, said particles being distributed at least partially into said inner ply or outer ply or both, wherein the mineral filler particles have a $d_{50}$ from about 0.1 to about 10 μm, and wherein the inner ply, the outer ply, or both the inner and outer plies further comprise a water-resistant agent.

2. The board of claim 1, wherein said inorganic or mineral fibers are glass fibers.

3. The board of claim 1, wherein said particles are distributed at least partially into both said inner ply and said outer ply.

4. The board of claim 1, wherein said particles are distributed substantially fully into both said inner ply and said outer ply.

5. The board of claim 1, wherein the inner ply comprises, by weight based on the total weight of the fibers, from 25 to 60 wt % of cellulose fibers, from 25 to 60 wt % of glass fibers, and from 0 to 30 wt % of organic fibers.

6. The board of claim 1, wherein the inner ply comprises, by weight based on the total weight of the fibers, from 30 to 50 wt % of cellulose fibers, from 30 to 50 wt % of glass fibers, and from 10 to 20 wt % of organic fibers.

7. The board of claim 1, wherein the inner and outer plies are bonded with first and second resinous binders, respectively, wherein the first and second resinous binders are the same.

8. The board of claim 1, wherein the inner ply or the outer ply or both plies are bonded with a self cross-linkable binder or an hydrophobic binder or a mixture thereof.

9. The board of claim 1, wherein the mineral filler particles have a $d_{50}$ from about 0.5 to about 5 μm.

10. The board of claim 1, wherein the inner ply or the outer ply or both plies further comprises a water-resistant agent.

11. The board of claim 1, wherein the inner ply or the outer ply or both plies further comprises a water-resistant agent which is a fluorocarbon repellent.

12. The board of claim 1, wherein based on the final weight of the mat-facer, the inner ply represents from about 30 to about 150 g/m², the outer ply represents from about 10 to about 70 g/m², and the binder and filler together represent from about 20 to about 150 g/m².

13. The board of claim 1, wherein the weight ratio binder:filler is from about 1:2 to about 8:1.

14. The board of claim 1, wherein the weight ratio binder:filler is from about 1:1 to about 4:1.

15. The board of claim 1, wherein said board comprises two mat-facers.

16. The board of claim 1, wherein the core comprises water-resistant additive in an amount sufficient such that the core absorbs less than about 10% water when tested in accordance with ASTM method C-473.

17. The board of claim 1, wherein the core comprises water-resistant additive in an amount sufficient such that the core absorbs less than about 5% water when tested in accordance with ASTM method C-473.

18. The board of claim 1, wherein the core comprises water-resistant additive in an amount sufficient such that the core absorbs less than about 3% water when tested in accordance with ASTM method C-473.

19. The board of claim 1, wherein the core comprises fibers.

20. The board of claim 1, wherein the core comprises fibers which are facer fibers or paper fibers.

21. The board of claim 1, wherein the core comprises fibers which are from recycling.

22. The board of claim 1, wherein the core comprises fire-resistant additive in an amount sufficient such that the board achieves an ASTM E-119 rating of at least about one hour.

23. The board of claim 1, wherein the core comprises glass fibers in an amount from about 0.1% to about 1% of the core weight.

24. A gypsum board comprising at least one mat-facer and a gypsum core, wherein said at least one mat-facer comprises at least two nonwoven plies, an inner ply and an outer ply, where the inner ply is in contact with the core of said gypsum board and comprises a mixture of cellulose fibers, inorganic or mineral fibers and organic fibers, and said outer ply comprises essentially cellulose fibers, wherein said mat-facer further comprises at least a binder and at least mineral filler particles, said particles are distributed substantially fully into both said inner ply and said outer ply, and wherein the inner ply comprises, by weight based on the total weight of the fibers, from 30 to 50 wt % of cellulose fibers, from 30 to 50 wt % of glass fibers, and from 10 to 20 wt % of organic fibers, and wherein the inner ply, the outer ply, or both the inner and outer plies further comprise a water-resistant agent.

25. The board of claim 24, wherein the inner and outer plies are bonded with first and second resinous binders, respectively, wherein the first and second resinous binders are the same resinous binder which is a self cross-linkable binder or an hydrophobic binder or a mixture thereof.

26. The board of claim 24, wherein the mineral filler particles have a $d_{50}$ from about 0.5 to about 5 μm.

27. The board of claim 24, wherein the inner and outer plies further comprise a water-resistant agent which is a fluorocarbon repellent.

28. The board of claim 24, wherein based on the final weight of the mat-facer, the inner ply represents from about 30 to about 150 g/m², the outer ply represents from about 10 to about 70 g/m², and the binder and filler together represent from about 20 to about 150 g/m².

29. The board of claim 24, wherein the weight ratio binder:filler is from about 1:1 to about 4:1.

30. The board of claim 24, wherein the core comprises water-resistant additive in an amount sufficient such that the core absorbs less than about 5% water when tested in accordance with ASTM method C-473.

31. The board of claim 24, wherein the core comprises glass fibers in an amount from about 0.1% to about 1% of the core weight.

32. The board of claim 24, wherein the core comprises fire-resistant additive in an amount sufficient such that the board achieves an ASTM E-119 rating of at least about one hour.

33. A gypsum board comprising at least one mat-facer and a gypsum core, wherein said at least one mat-facer comprises at least two nonwoven plies, an inner ply and an outer ply, and wherein the core comprises water-resistant additive in an amount sufficient such that the core absorbs less than about 10% water when tested in accordance with ASTM method C-473 and wherein the core comprises fire-resistant additive in an amount sufficient such that the board achieves an ASTM E-119 fire rating of at least about one hour, and wherein the inner ply, the outer ply, or both the inner and outer plies further comprise a water-resistant agent.

34. The board of claim 33, wherein said mat-facer of the gypsum board comprises at least two plies, an inner ply and an outer ply, where the inner ply is in contact with the core of said gypsum board and comprises a mixture of cellulose fibers, inorganic or mineral fibers and optionally organic fibers, and said outer ply comprises essentially cellulose fibers.

35. The board of claim 33, wherein the inner ply is in contact with the core of said gypsum board and comprises a mixture of cellulose fibers, inorganic or mineral fibers and optionally organic fibers, and said outer ply comprises essentially cellulose fibers, wherein said mat-facer further comprises at least a binder and at least mineral filler particles, said particles being distributed at least partially into said inner ply or outer ply or both plies.

36. The board of claim 34, wherein said mat-facer of the gypsum board comprises at least two plies, an inner ply and an outer ply, where the inner ply is in contact with the core of said gypsum board and where said mat-facer comprises a fibrous nonwoven inner ply and an outer ply, said inner ply and said outer ply comprising fibers or particles or both, the fibers in the inner ply and the fibers or particles or both in the outer ply being bonded together with a same resinous binder.

37. The board of claim 36, wherein in said mat-facer, the fibers or particles or both in the outer ply amount to about 0.5-20% by weight of the fibers in the inner ply of the mat-facer and wherein the fibers or particles or both in the outer ply are large enough that more than 99 percent of the particles or fibers or both are larger than the openings between the fibers in the inner ply.

38. An exterior insulation system for a building comprising a mat-facer gypsum board comprising at least one mat-facer and a gypsum core, insulating material having an inner surface and an outer surface, the inner surface of which is adhered to the surface of the mat-facer of said gypsum board by an adhesive material, and an exterior finishing material overlying the outer surface of said insulating material, wherein said mat-facer of the gypsum board comprises at least two nonwoven plies, an inner ply and an outer ply, where the inner ply is in contact with the core of said gypsum board and comprises a mixture of cellulose fibers, inorganic or mineral fibers and optionally organic fibers, and said outer ply comprises essentially cellulose fibers, and wherein the inner ply, the outer ply, or both the inner and outer plies further comprise a water-resistant agent.

39. An exterior insulation system for a building comprising a mat-facer gypsum board comprising at least one mat-facer and a gypsum core, insulating material having an inner surface and an outer surface, the inner surface of which is adhered to the surface of the mat-facer of said gypsum board by an adhesive material, and an exterior finishing material overlying the outer surface of said insulating material, wherein said mat-facer of the gypsum board comprises at least two nonwoven plies, an inner ply and an outer ply, where the inner ply is in contact with the core of said gypsum board and where said mat-facer comprises a fibrous nonwoven inner ply and an outer ply, said inner ply and said outer ply comprising fibers or particles or both, the fibers in the inner ply and the fibers or particles or both in the outer ply being bonded together with a same resinous binder, and wherein the inner ply, the outer ply, or both the inner and outer plies further comprise a water-resistant agent.

40. The system of claim 39, wherein in said mat-facer, the fibers or particles or both in the outer ply amount to about 0.5-20% by weight of the fibers in the inner ply of the mat-facer and wherein the fibers or particles or both in the outer ply are large enough that more than 99 percent of the particles or fibers or both are larger than the openings between the fibers in the inner ply.

41. The system of claim 38, including a reinforcing member sandwiched between said insulating material and said finishing material.

42. The system of claim 39, including a reinforcing member sandwiched between said insulating material and said finishing material.

43. An exterior finishing system for a building comprising an underlying structural support element which is covered with an overlying finishing material, said support element including mat-facer gypsum board comprising a set gypsum core sandwiched between two sheets of facers, the gypsum core including water-resistant additives in an amount at least sufficient to impart to the core improved water-resistant properties, wherein said mat-facer of the gypsum board comprises at least two nonwoven plies, an inner ply and an outer ply, where the inner ply is in contact with the core of said gypsum board and comprises a mixture of cellulose fibers, glass fibers and optionally organic fibers, and said outer ply comprises essentially cellulose fibers, and wherein the inner ply, the outer ply, or both the inner and outer plies further comprise a water-resistant agent.

44. An exterior finishing system for a building comprising an underlying structural support element which is covered with an overlying finishing material, said support element including mat-facer gypsum board comprising a set gypsum core sandwiched between two sheets of facers, the gypsum core including water-resistant additives in an amount at least sufficient to impart to the core improved water-resistant properties, wherein said mat-facer of the gypsum board comprises at least two nonwoven plies, an inner ply and an outer ply, where the inner ply is in contact with the core of said gypsum board and where said mat-facer comprises a fibrous non-woven inner ply and an outer ply, said inner ply and said outer piy comprising fibers or particles or both, the fibers in the inner ply and the fibers or particles or both in the outer ply being bonded together with first and second resinous binders, respectively, wherein the first and second resinous binders are the same, and wherein the inner ply, the outer ply, or both the inner and outer plies further comprise a water-resistant agent.

45. The system of claim 44, wherein in said mat-facer, the fibers or particles or both in the outer ply amount to about 0.5-20% by weight of the fibers in the inner ply of the mat-facer and wherein the fibers or particles or both in the outer ply are large enough that more than 99 percent of the particles or fibers or both are larger than the openings between the fibers in the inner ply.

46. An internal wet or humid area partition assembly system comprising metal or wood framework or studs for support of a board, said board including a mat-facer gypsum board comprising a set gypsum core sandwiched between two sheets of facers, the gypsum core including water-resistant additives in an amount at least sufficient to impart to the core improved water-resistant properties, wherein said mat-facer of the gypsum board comprises at least two nonwoven plies, an inner ply and an outer ply, where the inner ply is in contact with the core of said gypsum board and comprises a mixture of cellulose fibers, inorganic or mineral fibers and optionally organic fibers, and said outer ply comprises essentially cellulose fibers, and wherein the inner ply, the outer ply, or both the inner and outer plies further comprise a water-resistant agent.

47. An internal wet or humid area partition assembly system comprising metal or wood framework or studs for support of a board, said board including a mat-facer gypsum board comprising a set gypsum core sandwiched between two sheets of facers, the gypsum core including water-resistant additives in an amount at least sufficient to impart to the core improved water-resistant properties, wherein said mat-facer of the gypsum board comprises at least two nonwoven plies, an inner ply and an outer ply, where the inner ply is in contact with the core of said gypsum board and where said mat-facer comprises a fibrous nonwoven inner ply and an outer ply, said inner ply and said outer ply comprising fibers or particles or both, the fibers in the inner ply and the fibers or particles or both in the outer piy being bonded together with first and second resinous binders, respectively, wherein the first and second resinous binders are the same, and wherein the inner ply, the outer ply, or both the inner and outer plies further comprise a water-resistant agent.

48. The system of claim 47, wherein in said mat-facer, the fibers or particles or both in the outer ply amount to about 0.5-20% by weight of the fibers in the inner ply of the mat-facer and wherein the fibers or particles or both in the outer ply are large enough that more than 99 percent of the particles or fibers or both are larger than the openings between the fibers in the inner ply.

49. The system of claim 38, wherein the inner ply comprises, by weight based on the total weight of the fibers, from 30 to 50 wt % of cellulose fibers, from 30 to 50 wt % of glass fibers, and from 10 to 20 wt % of organic fibers.

50. The system of claim 38, wherein the inner and outer plies are bonded with the same resinous binder which is a self cross-linkable binder or an hydrophobic binder or a mixture thereof.

51. The system of claim 38, wherein the mineral filler particles have a $d_{50}$ from about 0.5 to about 5 µm.

52. The system of claim 38, wherein the inner and outer plies further comprise a water-resistant agent which is a fluorocarbon repellent.

53. The system of claim 38, wherein based on the final weight of the mat-facer, the inner ply represents from about 30 to about 150 g/m², the outer ply represents from about 10 to about 70 g/m², and the binder and filler together represent from about 20 to about 150 g/m².

54. The system of claim 38, wherein the weight ratio binder:filler is from about 1:1 to about 4:1.

55. The system of claim 38, wherein the core comprises water-resistant additive in an amount sufficient such that the core absorbs less than about 5% water when tested in accordance with ASTM method C-473.

56. The system of claim 38, wherein the core comprises glass fibers in an amount from about 0.1% to about 1% of the core weight.

57. The system of claim 38, wherein the core comprises fire-resistant additive in an amount sufficient such that the board achieves an ASTM E-119 rating of at least about one hour.

58. The system of claim 38, wherein the board is according to claim 1.

59. The system of claim 38, wherein the board is according to claim 24.

60. The system of claim 39, wherein the inner ply comprises, by weight based on the total weight of the fibers, from 30 to 50 wt % of cellulose fibers, from 30 to 50 wt % of glass fibers, and from 10 to 20 wt % of organic fibers.

61. The system of claim 39, wherein the inner and outer plies are bonded with the same resinous binder which is a self cross-linkable binder or an hydrophobic binder or a mixture thereof.

62. The system of claim 39, wherein the mineral filler particles have a $d_{50}$ from about 0.5 to about 5 µm.

63. The system of claim 39, wherein the inner and outer plies further comprise a water-resistant agent which is a fluorocarbon repellent.

64. The system of claim 39, wherein based on the final weight of the mat-facer, the inner ply represents from about 30 to about 150 g/m², the outer ply represents from about 10 to about 70 g/m², and the binder and filler together represent from about 20 to about 150 g/m².

65. The system of claim 39, wherein the weight ratio binder:filler is from about 1:1 to about 4:1.

66. The system of claim 39, wherein the core comprises water-resistant additive in an amount sufficient such that the core absorbs less than about 5% water when tested in accordance with ASTM method C-473.

67. The system of claim 39, wherein the core comprises glass fibers in an amount from about 0.1% to about 1% of the core weight.

68. The system of claim 39, wherein the core comprises fire-resistant additive in an amount sufficient such that the board achieves an ASTM E-119 rating of at least about one hour.

69. The system of claim 39, wherein the board is according to claim 1.

70. The system of claim 39, wherein the board is according to claim 24.

71. The system of claim 43, wherein the inner ply comprises, by weight based on the total weight of the fibers, from 30 to 50 wt % of cellulose fibers, from 30 to 50 wt % of glass fibers, and from 10 to 20 wt % of organic fibers.

72. The system of claim 43, wherein the inner and outer plies are bonded with the same resinous binder which is a self cross-linkable binder or an hydrophobic binder or a mixture thereof.

73. The system of claim 43, wherein the mineral filler particles have a $d_{50}$ from about 0.5 to about 5 µm.

74. The system of claim 43, wherein the inner and outer plies further comprise a water-resistant agent which is a fluorocarbon repellent.

75. The system of claim 43, wherein based on the final weight of the mat-facer, the inner ply represents from about 30 to about 150 g/m², the outer ply represents from about 10 to about 70 g/m², and the binder and filler together represent from about 20 to about 150 g/m².

76. The system of claim 43, wherein the weight ratio binder:filler is from about 1:1 to about 4:1.

77. The system of claim 43, wherein the core comprises water-resistant additive in an amount sufficient such that the core absorbs less than about 5% water when tested in accordance with ASTM method C-473.

78. The system of claim 43, wherein the core comprises glass fibers in an amount from about 0.1% to about 1% of the core weight.

79. The system of claim 43, wherein the core comprises fire-resistant additive in an amount sufficient such that the board achieves an ASTM E-119 rating of at least about one hour.

80. The system of claim 43, wherein the board is according to claim 1.

81. The system of claim 43, wherein the board is according to claim 24.

82. The system of claim 44, wherein the inner ply comprises, by weight based on the total weight of the fibers, from 30 to 50 wt % of cellulose fibers, from 30 to 50 wt % of glass fibers, and from 10 to 20 wt % of organic fibers.

83. The system of claim 44, wherein the inner and outer plies are bonded with the same resinous binder which is a self cross-linkable binder or an hydrophobic binder or a mixture thereof.

84. The system of claim 44, wherein the mineral filler particles have a $d_{50}$ from about 0.5 to about 5 µm.

85. The system of claim 44, wherein the inner and outer plies further comprise a water-resistant agent which is a fluorocarbon repellent.

86. The system of claim 44, wherein based on the final weight of the mat-facer, the inner ply represents from about 30 to about 150 g/m², the outer ply represents from about 10 to about 70 g/m², and the binder and filler together represent from about 20 to about 150 g/m².

87. The system of claim 44, wherein the weight ratio binder:filler is from about 1:1 to about 4:1.

88. The system of claim 44, wherein the core comprises water-resistant additive in an amount sufficient such that the core absorbs less than about 5% water when tested in accordance with ASTM method C-473.

89. The system of claim 44, wherein the core comprises glass fibers in an amount from about 0.1% to about 1% of the core weight.

90. The system of claim 44, wherein the core comprises fire-resistant additive in an amount sufficient such that the board achieves an ASTM E-119 rating of at least about one hour.

91. The system of claim 44, wherein the board is according to claim 1.

92. The system of claim 44, wherein the board is according to claim 24.

93. The system of claim 46, wherein the inner ply comprises, by weight based on the total weight of the fibers, from 30 to 50 wt % of cellulose fibers, from 30 to 50 wt % of glass fibers, and from 10 to 20 wt % of organic fibers.

94. The system of claim 46, wherein the inner and outer plies are bonded with the same resinous binder which is a self cross-linkable binder or an hydrophobic binder or a mixture thereof.

95. The system of claim 46, wherein the mineral filler particles have a $d_{50}$ from about 0.5 to about 5 µm.

96. The system of claim 46, wherein the inner and outer plies further comprise a water-resistant agent which is a fluorocarbon repellent.

97. The system of claim 46, wherein based on the final weight of the mat-facer, the inner ply represents from about 30 to about 150 g/m², the outer ply represents from about 10 to about 70 g/m², and the binder and filler together represent from about 20 to about 150 g/m².

98. The system of claim 46, wherein the weight ratio binder:filler is from about 1:1 to about 4:1.

99. The system of claim 46, wherein the core comprises water-resistant additive in an amount sufficient such that the core absorbs less than about 5% water when tested in accordance with ASTM method C-473.

100. The system of claim 46, wherein the core comprises glass fibers in an amount from about 0.1% to about 1% of the core weight.

101. The system of claim 46, wherein the core comprises fire-resistant additive in an amount sufficient such that the board achieves an ASTM E-119 rating of at least about one hour.

102. The system of claim 46, wherein the board is according to claim 1.

103. The system of claim 46, wherein the board is according to claim 24.

104. The system of claim 47, wherein the inner ply comprises, by weight based on the total weight of the fibers, from 30 to 50 wt % of cellulose fibers, from 30 to 50 wt % of glass fibers, and from 10 to 20 wt % of organic fibers.

105. The system of claim 47, wherein the inner and outer plies are bonded with the same resinous binder which is a self cross-linkable binder or an hydrophobic binder or a mixture thereof.

106. The system of claim 47, wherein the mineral filler particles have a $d_{50}$ from about 0.5 to about 5 µm.

107. The system of claim 47, wherein the inner and outer plies further comprise a water-resistant agent which is a fluorocarbon repellent.

108. The system of claim 47, wherein based on the final weight of the mat-facer, the inner ply represents from about 30 to about 150 g/m², the outer ply represents from about 10 to about 70 g/m², and the binder and filler together represent from about 20 to about 150 g/m².

109. The system of claim 47, wherein the weight ratio binder:filler is from about 1:1 to about 4:1.

110. The system of claim 47, wherein the core comprises water-resistant additive in an amount sufficient such that the core absorbs less than about 5% water when tested in accordance with ASTM method C-473.

111. The system of claim 47, wherein the core comprises glass fibers in an amount from about 0.1% to about 1% of the core weight.

112. The system of claim 47, wherein the core comprises fire-resistant additive in an amount sufficient such that the board achieves an ASTM E-119 rating of at least about one hour.

113. The system of claim 47, wherein the board is according to claim 1.

114. The system of claim 47, wherein the board is according to claim 24.

115. A shaft wall assembly comprising a board according to claim 1.

116. A shaft wall assembly comprising a board according to claim 24.

117. An exterior finishing system comprising a board according to claim 1.

118. An exterior finishing system comprising a board according to claim 24.

119. An exterior insulation system comprising a board according to claim 1.

120. An exterior insulation system comprising a board according to claim 24.

121. Tile backing comprising a board according to claim 1.

122. Tile backing comprising a board according to claim 24.

123. Partitions and ceilings in wet area rooms comprising a board according to claim 1.

124. Partitions and ceilings in wet area rooms comprising a board according to claim 24.

125. The board of claim 1, wherein said nonwoven plies are wet laid nonwoven plies.

* * * * *